US011487066B2

(12) United States Patent
Mentovich et al.

(10) Patent No.: US 11,487,066 B2
(45) Date of Patent: Nov. 1, 2022

(54) OPTICAL TRANSCEIVERS WITH PROTECTIVE LAYERS

(71) Applicant: MELLANOX TECHNOLOGIES, LTD., Yokneam (IL)

(72) Inventors: Elad Mentovich, Tel Aviv (IL); Yaakov Gridish, Yoqneam Ilit (IL); Anna Sandomirsky, Nesher (IL); Alon Rubinstein, Kfar Yona (IL); Nimrod Rockman, Zichron Yaacov (IL); Dimitrios Kalavrouziotis, Papagou (GR)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/117,867

(22) Filed: Dec. 10, 2020

(65) Prior Publication Data

US 2022/0146767 A1 May 12, 2022

(30) Foreign Application Priority Data

Nov. 12, 2020 (GR) .............................. 20200100682

(51) Int. Cl.
*G02B 6/42* (2006.01)
*H04B 10/25* (2013.01)
*H04B 10/40* (2013.01)

(52) U.S. Cl.
CPC ......... *G02B 6/4253* (2013.01); *G02B 6/4234* (2013.01); *G02B 6/4246* (2013.01); *G02B 6/4292* (2013.01); *H04B 10/25* (2013.01); *H04B 10/40* (2013.01)

(58) Field of Classification Search
None
See application file for complete search history.

(56) References Cited

U.S. PATENT DOCUMENTS 4,830,454 A * 5/1989 Karstensen .............. G02B 3/00 359/664
5,286,338 A * 2/1994 Feldblum ................ C03C 15/00 216/26
6,252,719 B1 * 6/2001 Eichenbaum ........ G02B 27/145 359/634
6,724,543 B1 * 4/2004 Chinniah ............... G02B 13/18 359/718
2003/0048518 A1 * 3/2003 Pike ..................... C09D 171/00 359/245
2009/0010600 A1 * 1/2009 Kim ..................... G02B 6/4246 385/90

(Continued)

FOREIGN PATENT DOCUMENTS

GB 1210843 A * 11/1970 ............. C03C 3/118

*Primary Examiner* — Darren E Wolf
(74) *Attorney, Agent, or Firm* — Sheridan Ross P.C.

(57) ABSTRACT

A package includes a light emitting portion configured to emit light, a lens including a first lens surface and a second lens surface, a protective layer between the light emitting portion and the first lens surface and that shields the first lens surface from a surrounding environment, and an optical component that redirects light output from the second lens surface. The first lens surface is configured to receive the emitted light from the light emitting portion, the second lens surface is configured output light that has passed through the first lens surface, and the protective layer has a refractive index greater than 1.5.

20 Claims, 11 Drawing Sheets

(56) References Cited

U.S. PATENT DOCUMENTS

| | | | | |
|---|---|---|---|---|
| 2009/0168203 | A1* | 7/2009 | Yuan | G02B 5/205 359/737 |
| 2011/0262146 | A1* | 10/2011 | Khemakhem | G02B 6/4446 398/117 |
| 2018/0206298 | A1* | 7/2018 | Chen | G09G 3/32 |

* cited by examiner

OPTICAL TRANSCEIVERS WITH PROTECTIVE LAYERS

FIELD OF THE DISCLOSURE

The present disclosure is generally directed toward optical transceivers, for example, optical transceivers with protective layers that shield one or more components of the optical transceivers from a surrounding environment.

BACKGROUND

Optical fiber networks offer fast and reliable data transmission between devices. In these networks, optical transceivers are often employed to send and/or receive light signals modulated with data. Vertical cavity surface emitting lasers (VCSELs) are useful in these applications as the light source for the transmission portion of the transceiver. Data centers in which the transceivers operate may experience variations in environmental conditions such as changes in temperature, humidity, and the like. Over time, this can cause degradation of components such as the electrical and/or optical components associated with the VCSEL. Component degradation can cause inefficiencies in signal transmission and reception and reduce the lifespan of the transceiver.

BRIEF SUMMARY

In an illustrative embodiment, a package is described that includes a light emitting portion configured to emit light, a lens including a first lens surface and a second lens surface, a protective layer between the light emitting portion and the first lens surface and that shields the first lens surface from a surrounding environment, and an optical component that redirects light output from the second lens surface. The first lens surface is configured to receive the emitted light from the light emitting portion, and the second lens surface is configured output light that has passed through the first lens surface. The protective layer has a refractive index greater than 1.5.

In another illustrative embodiment, an optical package includes a housing. A transmitter is included in the housing and includes a light emitting portion configured to emit light modulated according to a first data signal, a first lens spaced apart from the light emitting portion and configured to receive the emitted light from the light emitting portion, and a first parylene layer between the light emitting portion and the first lens to shield a first lens surface of the first lens from a surrounding environment. The optical package includes a receiver in the housing. The receiver includes an optical detector configured to detect light modulated according to a second data signal, a second lens spaced apart from the optical detector and configured to direct the light modulated according to the second data signal to the optical detector, and a second parylene layer between the optical detector and a first lens surface of the second lens to shield the first lens surface of the second lens from the surrounding environment.

In another illustrative embodiment, an optical package includes a housing, and the housing includes a first lens surface, a parylene layer that encapsulates the first lens surface, a second lens surface opposite the first lens surface, an optical component configured to redirect light received through the first lens surface and the second lens surface, and a connector configured to mechanically connect with and optically align an optical fiber. The optical package further includes a vertical cavity surface emitting laser (VCSEL) positioned in the housing and configured to emit light along an optical path that traverses the first lens surface, the second lens surface, the optical component, and the connector in.

Additional features and advantages are described herein and will be apparent from the following description and the figures.

BRIEF DESCRIPTION OF THE DRAWINGS

The present disclosure is described in conjunction with the appended figures, which are not necessarily drawn to scale.

DETAILED DESCRIPTION

Figure 1:
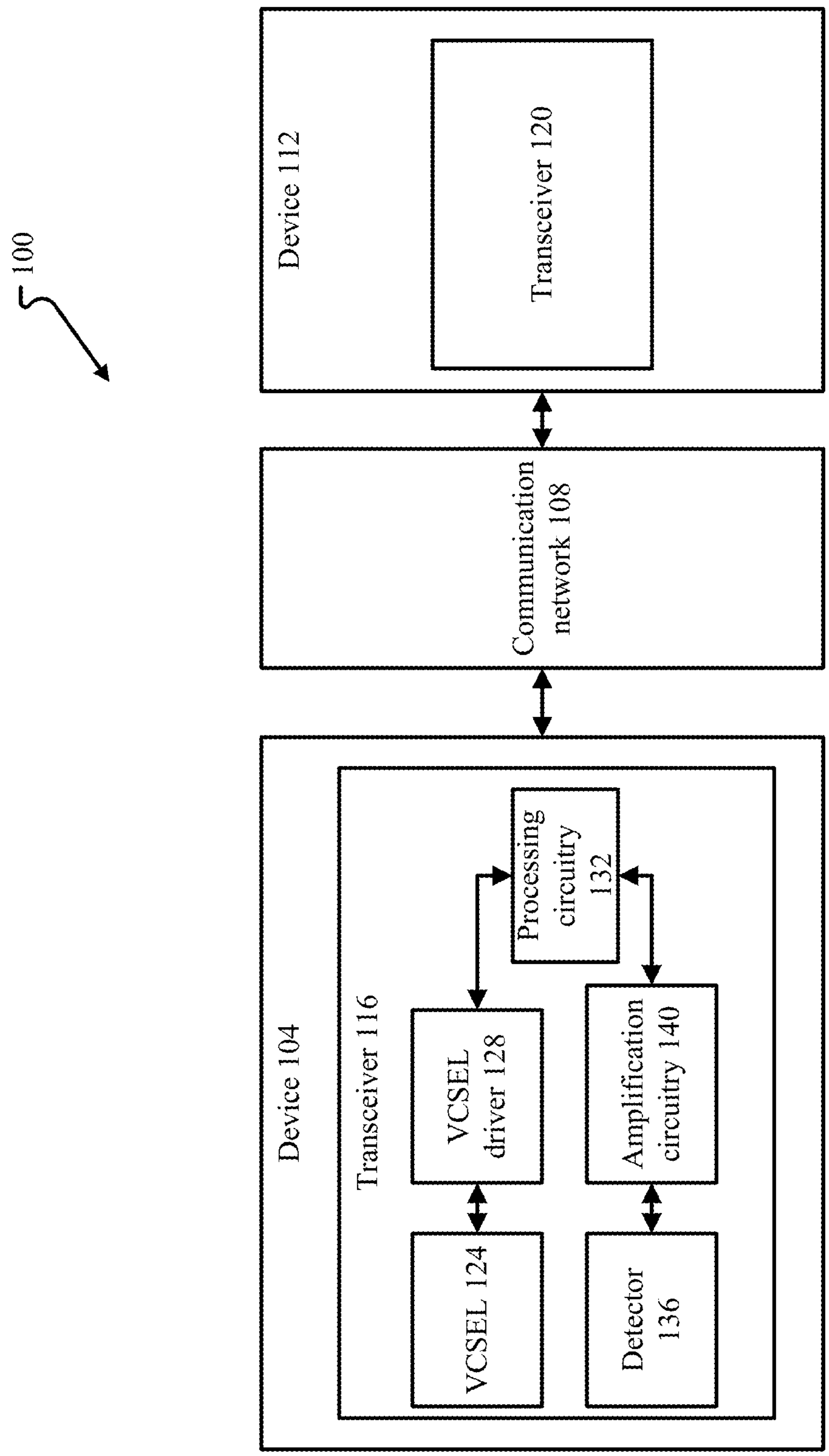
FIG. 1 illustrates an optical system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Inventive concepts are directed to optical transceivers for transmitting/receiving optical signals, for example, that have been modulated with data. In order to better protect electrical and optical components of the transceiver, various components are encapsulated by a protective layer, such as a parylene layer. For example, in a transmission portion of the transceiver, the parylene layer may be formed directly on a surface of a lens within the optical transceiver or formed over an emitter (e.g., VCSEL) with the lens surface placed in contact with the parylene formed over the emitter. Alternatively, the parylene layer is formed to fill a space between the lens and the emitter, which covers both the lens surface and the emitter. The conic constants and/or radii of curvatures for the lens surface with the parylene layer and an output lens without the parylene layer are designed to achieve the desired efficiency. In addition to covering the emitter and/or a lens surface closest to the emitter, the parylene layer may cover and protect other optical and/or electrical components of the transceiver if desired. For example, the parylene layer may encapsulate the VCSEL driver and/or circuitry for the optical detector. The same parylene layer concept may be applied to a receiving portion of the optical system, where a lens closest to an optical detector (photosensor) and/or the optical detector are covered with parylene.

Inventive concepts further address the problem of humidity and accumulation of condensation in optical transceivers that, over time, can harm the electrical components and/or optical components and reduce their lifespan. In at least one example embodiment, selected electrical and optical components of the transceiver are covered or encapsulated with a protective layer, such as parylene, which seals the components and shields the components from a surrounding environment. Parylene will create a tight, uniform coating that will protect transceiver from humidity and other environmental conditions.

FIG. 1 illustrates an optical system 100 according to at least one example embodiment. The optical system 100 includes a device 104, a communication network 108, and a device 112. In at least one example embodiment, devices 104 and 112 correspond to one or more of a Personal Computer (PC), a laptop, a tablet, a smartphone, a server, a collection of servers, or the like. In some embodiments, the devices 104 and 112 may correspond to any appropriate type of device that communicates with other devices also connected to a common type of communication network 108. As another specific but non-limiting example, the devices 104 and 112 may correspond to servers offering information resources, services and/or applications to user devices, client devices, or other hosts in the system 100.

Examples of the communication network 108 that may be used to connect the devices 104 and 112 include an Internet Protocol (IP) network, an Ethernet network, an InfiniBand (IB) network, a Fibre Channel network, the Internet, a cellular communication network, a wireless communication network, combinations thereof (E.g., Fibre Channel over Ethernet), variants thereof, and/or the like. In one specific, but non-limiting example, the communication network 108 is a network that enables data transmission between the devices 104 and 112 using optical signals.

The device 104 includes a transceiver 116 for sending and receiving optical signals. The optical signals may be modulated with data. Likewise, the device 112 may include a transceiver 120 for sending and receiving optical signals modulated with data. The structure of the transceiver 116 is discussed in more detail below, but it should be understood that the same or similar structure may be applied to transceiver 120, and thus, the structure of transceiver 120 is not described separately.

Still with reference to FIG. 1, the transceiver 116 includes a light emitting portion, such as a VCSEL 124. The VCSEL 124 may be a single VCSEL or an array of VCSELs depending on design preferences. The transceiver 116 further includes a driver for the light emitting portions, such as VCSEL driver 128, which may include appropriate driving circuitry for causing the VCSEL 124 to emit light (e.g., modulated light) under control of the processing circuitry 132. The transceiver 116 further includes processing circuitry 132, amplification circuitry 140, and detector 136. Here, it should be appreciated that the VCSEL 124 and VCSEL driver 128 are elements associated with transmission capabilities of the transceiver 116, while the detector 136 and the amplification circuitry 140 are elements associated with receive capabilities of the transceiver 116.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control overall operation of the transceiver 116.

The detector 136 may comprise an optical detector for detecting optical signal. For example, the detector 136 may include one or more photodiodes or other photosensor(s) (e.g., phototransistors, avalanche photodiodes, and/or the like) for converting incident light into electrical signals. In at least one example embodiment, the detector 136 may comprise a plurality of photosensors in an array, where each photosensor is associated with a pixel in the array.

The amplification circuitry 140 may comprise circuitry for amplifying the electrical signals output from the detector 136 to ensure the processing circuitry 132 receives the electrical signals with sufficient amplitude. A specific, but non-limiting, example of the amplification circuitry 140 is one or more transimpedance amplifiers (TIAs). Additionally or alternatively, other suitable amplification circuity generally known in the art may also be employed.

Although not explicitly shown, it should be appreciated that devices 104 and 112 may include other processing devices, storage devices, and/or communication interfaces generally associated with computing tasks, such as sending and receiving data.

Figure 2A:
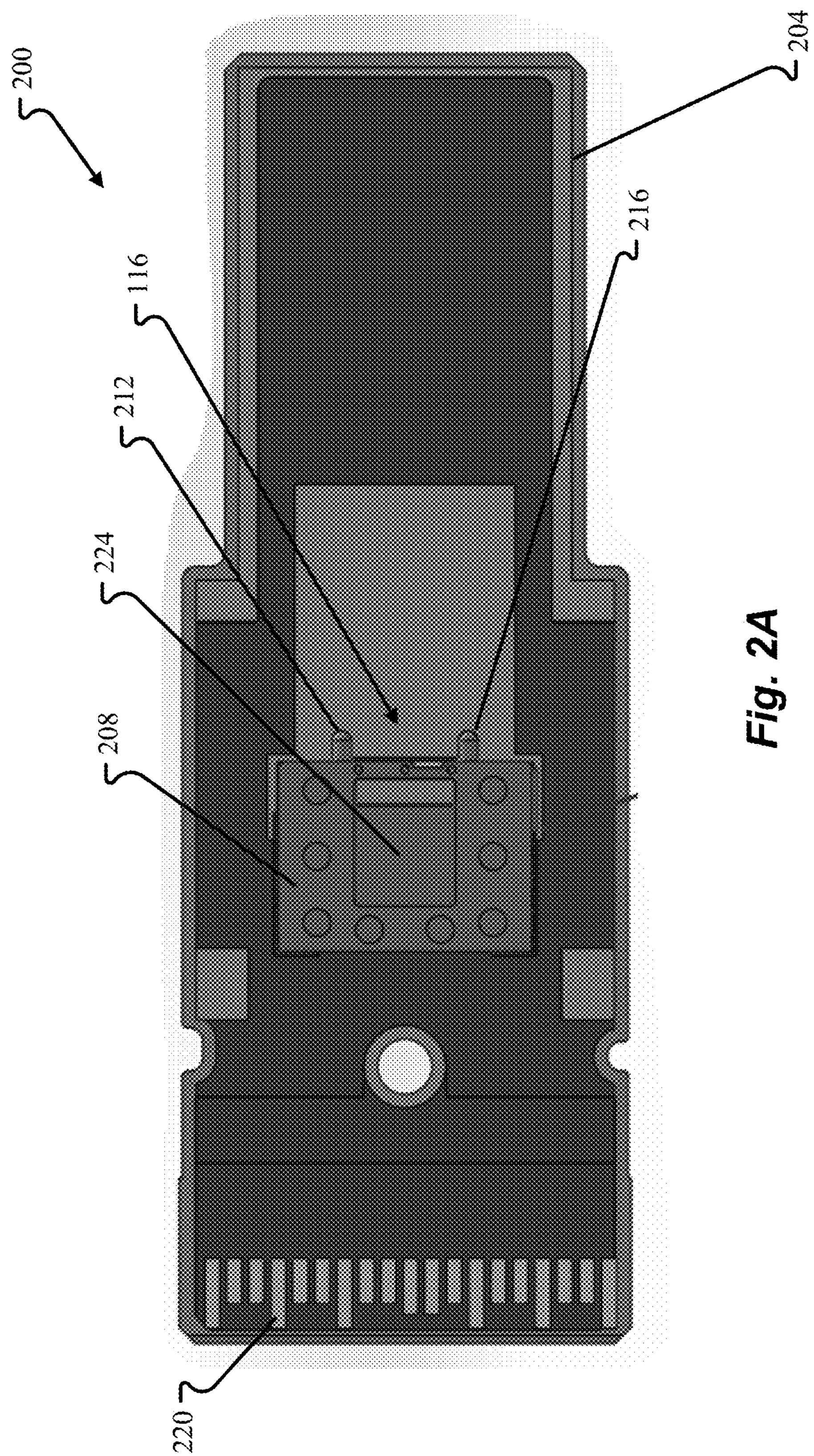
FIG. 2A illustrates a plan view of a package including a transceiver from the optical system of FIG. 1 according to at least one example embodiment.

FIG. 2A illustrates a plan view of a package 200 that includes the transceiver 116 from the optical system 100 of FIG. 1 according to at least one example embodiment. As noted above, the transceiver 120 may have the same or similar structure as transceiver 116, and thus, such description is omitted.

As shown in FIG. 2A, the package 200 includes the transceiver 116, a support substrate 204, a housing 208, connectors 212 and 216, and electrical contacts 220.

The support substrate 204 may be a single layer or multi-layer PCB or other suitable substrate for supporting elements of the transceiver 116 and/or mounting elements of the transceiver 116. The support substrate 204 may include one or more electrical traces to carry signals between elements of the transceiver 116.

As discussed in more detail below with FIG. 2B, the housing 208 may house various electrical and/or optical components of the transceiver 116. The housing 208 may comprise molded plastic or other suitable material. The housing 208 may include an opening or cavity 224 to allow dissipation of heat generated by the transceiver 116.

The housing 208 further includes connectors 212 and 216. The connectors 212 and 216 may facilitate connection to optical fibers or other waveguides for transmitting optical signals. In other words, each connector 212 and 216 is configured to mechanically connect to and optically align with an optical fiber or waveguide. In at least one example embodiment, one connector 212 or 216 is associated with transmit functions of the transceiver 116 while the other connector 212 or 216 is associated with receive functions of the transceiver 116. The connectors 212 and 216 may include one or more lenses for focusing light into or out of the optical fiber. Additionally or alternatively, the housing 208 may include one or more lenses in addition to lens 234 for focusing light input to or output from the optical fiber.

The electrical contacts 220 comprise one or more electrical traces on the support substrate 204 and facilitate electrical connection to a port or communication interface of the device 104. Thus, FIG. 2A illustrates an example where the transceiver 116 is implemented as an attachment card, for example, a physical medium attachment card. The electrical contacts 220 in combination with other traces carry power signals and/or data signals between the device 104 and the transceiver 116. The number, size, and arrangement of the electrical contacts 220 may vary according to design preference.

Although not explicitly shown, it should be appreciated that one or more additional housings may be mounted to the substrate in order to cover the housing 208 and as much of the support substrate 204 as desired.

Figure 2B:
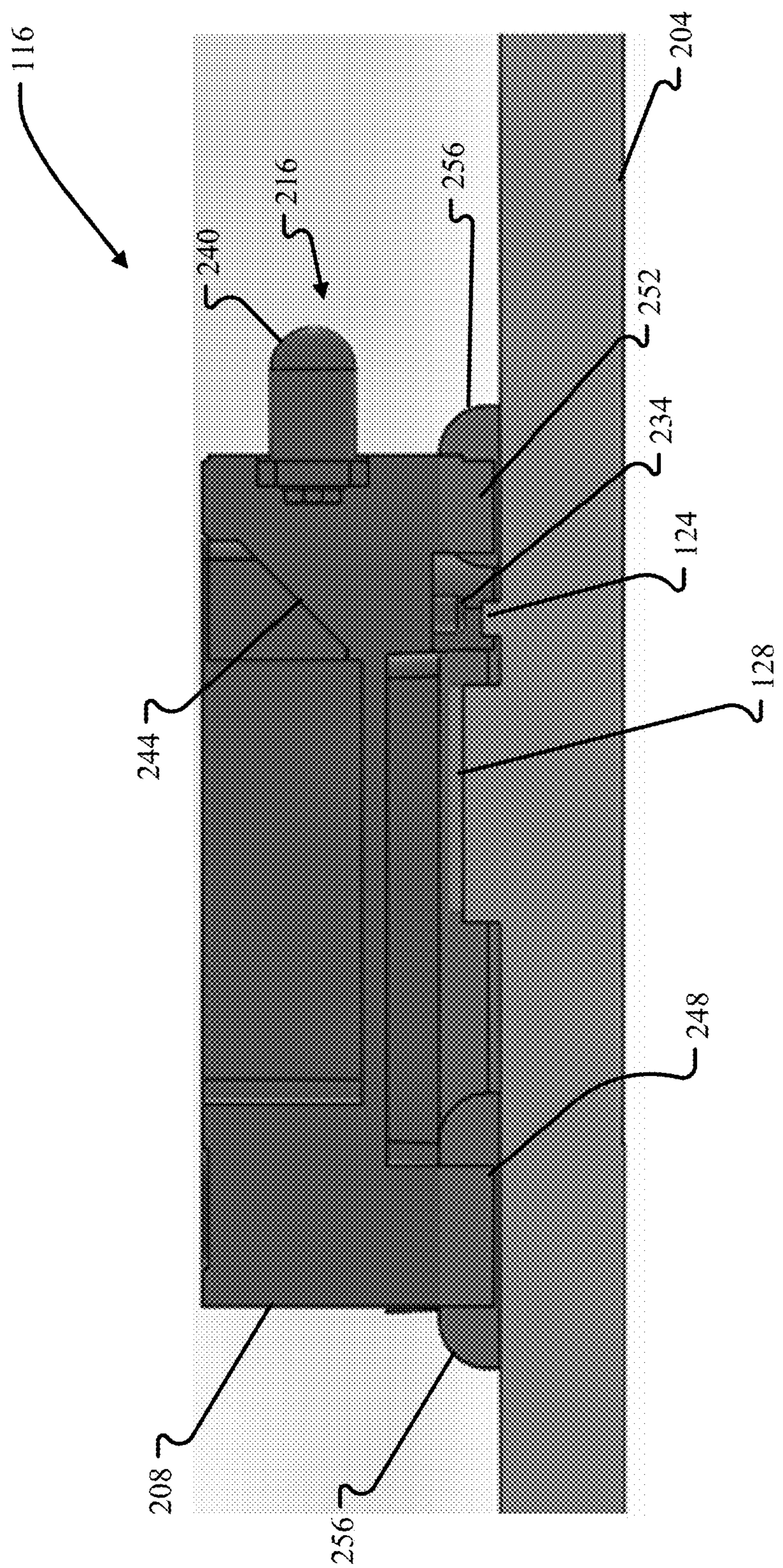
FIG. 2B illustrates a side view of the transceiver from FIG. 2A according to at least one example embodiment.

FIG. 2B illustrates a side view of the transceiver 116 from FIG. 2A according to at least one example embodiment. In more detail, FIG. 2B shows the transmit side of the transceiver 116, which includes the VCSEL 124 and the VCSEL driver 128. As shown, the VCSEL 124, the VCSEL driver 128, a lens 234, and an optical component 244 are positioned in the housing 208. In the example of FIG. 2B, the VCSEL 124 and VCSEL driver 128 are mounted to the support substrate 204 (e.g., prior to mounting the housing 208). However, example embodiments are not limited thereto, and these components may be integrated with the housing 208 if desired. A distance between the VCSEL 124 and the lens 234 may be in the range of 300 um to 400 um.

Here, it should be appreciated that the receive portion of the transceiver 116 may have substantially the same structure as illustrated in FIG. 2B except that the detector 136 replaces the VCSEL 124 and the amplification circuitry 140 replaces the VCSEL driver 128.

The housing 208 may include legs 248 and 252 that are mounted to the support substrate 204 with an adhesive, pegs, or other suitable material for mounting the housing 208 to the support substrate 204. FIG. 2B illustrates an example where the legs 248 and 252 are mounted to the housing via layer 256. The layer 256 may be an adhesive layer, such as polymer or resin. In at least one example embodiment discussed in more detail with reference to FIGS. 2C-7, the layer 256 comprises parylene and encapsulates various elements of the transceiver 116. Encapsulated elements include, but are not limited to, the VCSEL 124, the VCSEL driver 128, the detector 136, the amplification circuitry 140, part of the lens 234, or any combination thereof. Thus, layer 256 may have both adhesion and protection functions to adhere the housing 208 to the support substrate and to protect elements of the transceiver 116 from surrounding environmental conditions (e.g., humidity, temperature, vibration, and the like).

As noted above, the connectors 212 and 216 and/or the housing 208 may include one or more lenses for focusing light input to or output from an optical fiber. FIG. 2B shows a lens 240 integrated with the tip of the connector 216. Additionally or alternatively, the lens(es) may be arranged in the connector 216 but located away from the tip. Although not shown in FIG. 2B, one or more lenses may be placed between the lens 234 and the connectors 212 and 216. For example, one or more lenses may be positioned between the optical component 244 and the connectors 212 and 216 to focus light input to or output from the optical fibers connected to the connectors 212 and 216.

Optical component 244 may comprise a mirror or other reflective component for redirecting optical signals. On the transmit side of the transceiver 116 in FIG. 2B, the optical component 244 reflects light emitted from the VCSEL 124 and that has passed through the lens 234 toward the connector 216 (and corresponding optical fiber if connected). On the receive side of the transceiver 116 (not explicitly shown), the optical component 244 may reflect optical signals received through connector 212 toward the detector 136. The optical component on the transmit side and the receive side of the transceiver 116 may be one unitary component 244 or separate components 244. Here, it should be appreciated that the optical component 244 redirects light at about or exactly at a 90 degree angle, or at any angle that aligns the optical path on the transmit side with an output optical axis of the optical fiber connected to connector 216 and aligns the optical path on the receive side with an input optical axis of the detector 136.

Figure 2C:
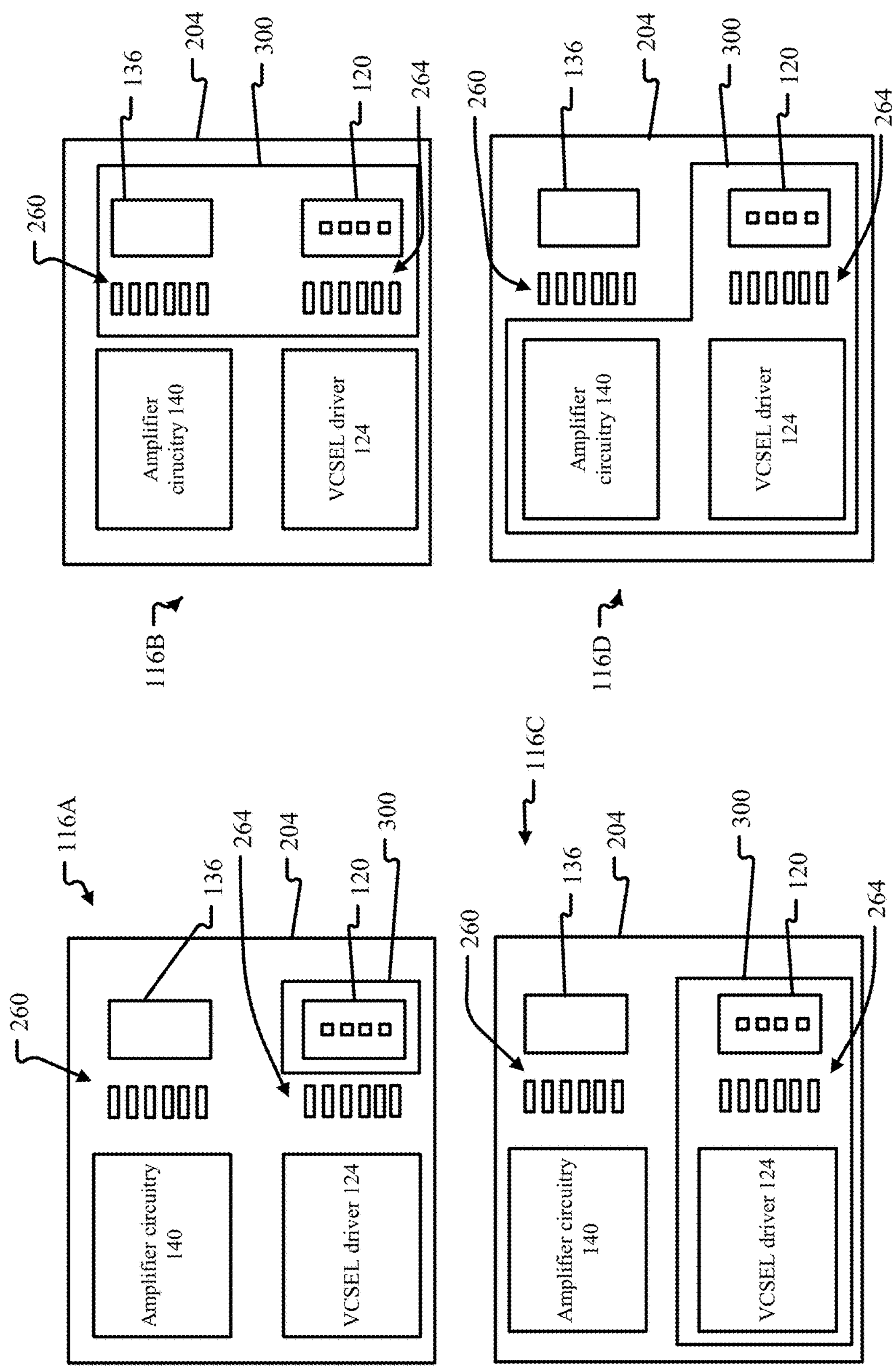
FIG. 2C illustrates plan views for example structures of the transceiver in FIGS. 2A and 2B.

FIG. 2C illustrates plan views for example structures of the transceiver 116 in FIGS. 2A and 2B. In particular, FIG. 2C illustrates example structures for transceivers 116A to 116D, where each structure includes a different configuration for a protective layer 300. The protective layer 300 may be the same layer as layer 256 or a layer in addition to layer 256. In at least one example embodiment, the protective layer 300 comprises parylene.

As shown in FIG. 2C, each transceiver 116A to 116D includes the VCSEL 124, the VCSEL driver 128, the detector 136, and amplifier circuitry 140 on the support substrate 204. Each transceiver 116A 116D further includes a first set of electrical contacts 260 and a second set of electrical contacts 264 on the support substrate 204. The first set of electrical contacts 260 may electrically connect the detector 136 to the amplifier circuitry 140 (e.g., with unillustrated bonding wires), while the second set of electrical contacts may electrically connect the VCSEL 124 to the VCSEL driver 128 (e.g., with unillustrated bonding wires). More or fewer contacts may be included and the arrangement of the contacts may be set depending on design preferences. In addition, it should be appreciated that the contacts 260 and 264 may be omitted if, for example, bonding wires directly connect the amplifier circuitry 140 to the detector 136 and the VCSEL 124 to the VCSEL driver 128.

FIG. 2C further illustrates different examples of which elements are encapsulated by the protective layer 300. In FIG. 2C, transceiver 116A illustrates that only the VCSEL 124 is encapsulated by the protective layer 300. Transceiver 116B illustrates that the protective layer 300 encapsulates the VCSEL 124, the detector 136, and the sets of contacts 260 and 264. Transceiver 116C illustrates that the protective layer 300 encapsulates the VCSEL 124, the VCSEL driver 128, and the contacts 264. Transceiver 116D illustrates that the protective layer 300 encapsulates the VCSEL 124, the VCSEL driver 128, the amplifier circuitry 140, and the contacts 264. In each structure 116A to 116D, the protective layer 300 may have a substantially uniform thickness over the entirety of the layer.

Example embodiments are not limited to the structures shown in FIG. 2C, and it should be appreciated that the protective layer 300 may encapsulate any combination of the elements (or all elements) shown in structures 116A to 116C. In addition, it should be appreciated that the protective layer 300 may comprise more than one unitary layer. For example, a separate protective layer 300 may be formed for each element desired to be encapsulated.

In accordance with example embodiments discussed herein, one or more protective layers 300 may be employed to protect various elements of the transceiver 116, such as the VCSEL 124, the VCSEL driver 128, the lens 234, the amplification circuitry 140, and/or the detector 136. The discussion of FIGS. 3-8B below set forth examples where the protective layer 300 comprises parylene due to its ability to protect components from conditions like humidity. The protective layer 300 discussed with respect to FIGS. 3-8B may be the same layer or different layer than layer 256 discussed above.

Figure 3:
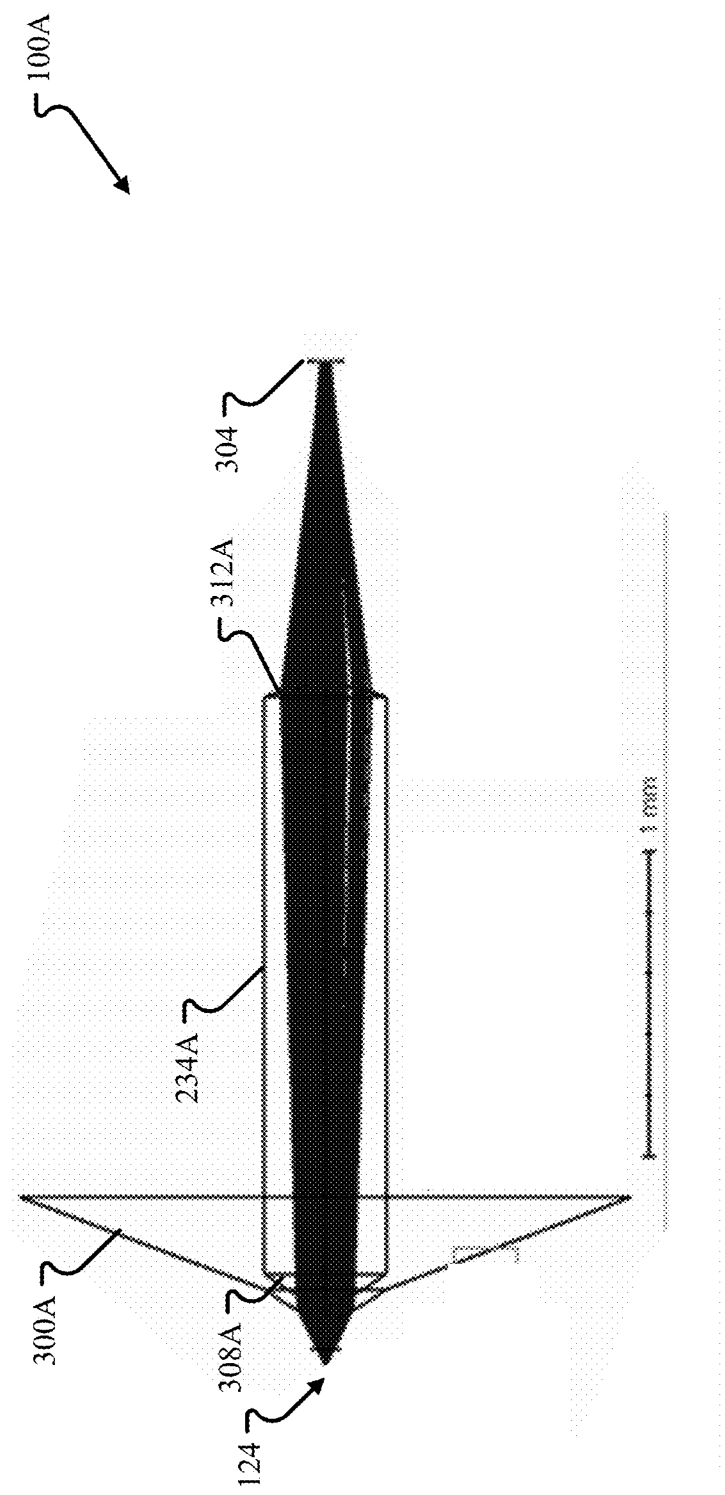
FIG. 3 illustrates a schematic representation of an optical system according to at least one example embodiment.
Figure 4:
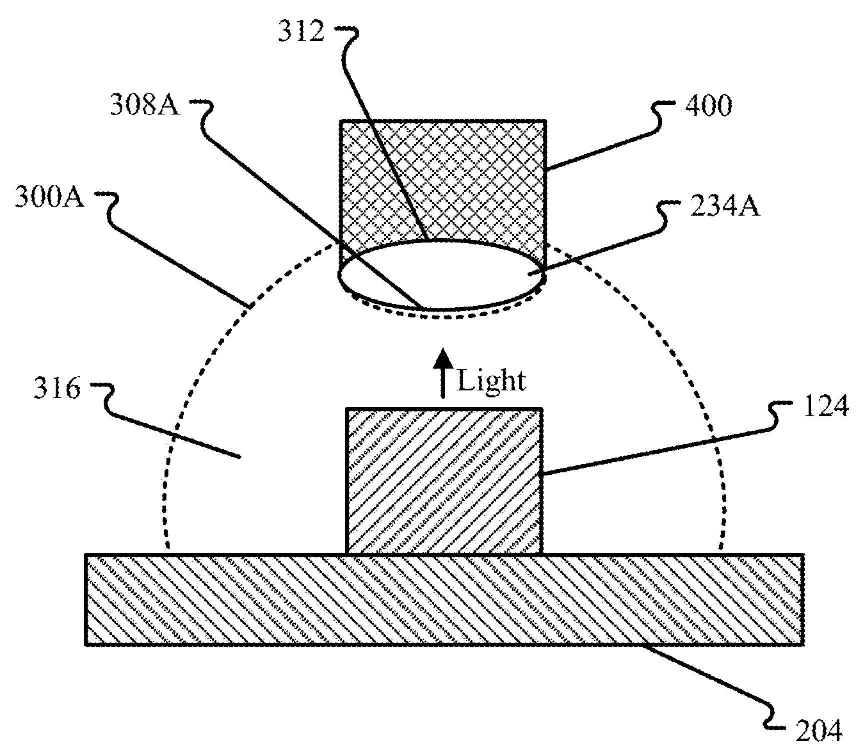
FIG. 4 illustrates an example structure of a protective layer for the optical system of FIG. 3 according to at least one example embodiment.

FIG. 3 illustrates a schematic representation of an optical system 100A according to at least one example embodiment. FIG. 4 illustrates an example structure for a lens 234A and a protective layer 300A for the schematic of FIG. 3 according to at least one example embodiment.

With reference to FIG. 3, the optical system 100A illustrates only those elements which were useful for conducting ray tracing simulation. As shown, the system 100A includes a VCSEL 124, a protective layer 300A (e.g., comprising parylene), lens 234A, and point 304.

The effect of the parylene encapsulation on the performance of the VCSEL optical transceiver 116 can be assessed using a ray tracing simulation with the system 100A. In this simulation and the simulation of FIG. 5, the VCSEL 124 is emulated by a number of rays exiting a 7 um spot with ray angles defined by the numerical aperture of the VCSEL 124. Those rays are then propagated in the optical system 100A, experiencing effects such refraction, reflection, scattering, and/or absorption. At the receiver side (i.e., at point 304), the rays are collected by an absorbing surface that operates as the optical signal detector. At the input of the optical detector at point 304, a custom surface is included to introduce apodization to the optical signal. The apodization and optical detector are intended to emulate the graded-index multimode fiber (MMF) that will be part of the fully assembled transceiver 116. Here, the apodization profile is tuned so as to resemble the characteristics of a 50 um MMF cable with graded index core and numerical aperture of 0.2.

FIGS. 3 and 4 illustrate an example where a substantially hollow bubble is formed around the VCSEL 124 as the protective layer 300A. The optical coupling lens 234A is assembled on the bubble and as a result one of the lens surfaces 308A is covered by the protective layer 300A. Indeed, FIG. 4 shows the protective layer 300A in dashed lines which encapsulates or seals the VCSEL 124 on all sides except for the side mounted to the support substrate 204. FIG. 4 further illustrates a cavity 316, which is filled with air, for example. As further shown, the lens 234A is held in place with lens support 400. During assembly, the lens 234A is placed onto the substantially hollow bubble of protective layer 300A, which depresses the protective layer 300A to fully encapsulate or seal the lens surface closest to the VCSEL 124. In at least one example, the lens 234A is depressed far enough into the protective layer 300A so that the protective layer 300 contacts sidewalls of the lens support 400 to ensure a tight seal around the lens surface 308A.

Still with reference to FIGS. 3 and 4, the lens 234A may be a bi-convex lens (e.g., comprising polymer) that includes a first lens surface 308A and a second lens surface 312A. The first lens surface 308A is closest to the VCSEL 124 and may be protected by the protective layer 300A, while the second lens surface 312A is on an opposite side of the lens 234A and not in contact with the protective layer 300A. In order to account for the inclusion of the protective layer 300A, the radius of curvature first lens surface 308A may be 120 um and the conic constant −2.766, while the second lens surface 312A may have a radius of curvature of 444 um and a conic constant of −4.755. With these specifications, the ray distribution on the point 304 (i.e., the optical detector or inside the graded index MMF core) achieves coupling efficiency of about 93.5%, which is within acceptable performance limits. In general, with a polymer lens 234A, the radius of curvature of the lens surface 308A should be between 350 um and 550 um and the conic constant of about −4.7.

In the event that the lens 234A comprises polymer and the protective layer 300A is parylene, then the protective layer 300A may further function as an antireflection coating. Here, the thickness of the protective layer 300A may be about 145 um on the lens surface 308A. Additionally or alternatively, additional antireflection layers (e.g., an SU-8 layer, or other layer with a refractive index between 1.5 and 1.6) may be included on the lens surface 308A.

Here, it should be appreciated that the lens surfaces 308A and 312A are different sides of a same lens 234A. However, example embodiments are not limited thereto, and two separate convex lenses may be employed if desired. In this case, a small space may exist between the two lenses, where one lens has the properties of the lens surface 308A and the other lens has the properties of lens surface 312A.

In addition, although not explicitly shown, it should be appreciated that only the VCSEL 124 and not the lens surface 308A can be encapsulated with the protective layer 300A if desired. In this case, the lens surface 308A would not be placed into contact with the protective layer 300A.

Figure 5:
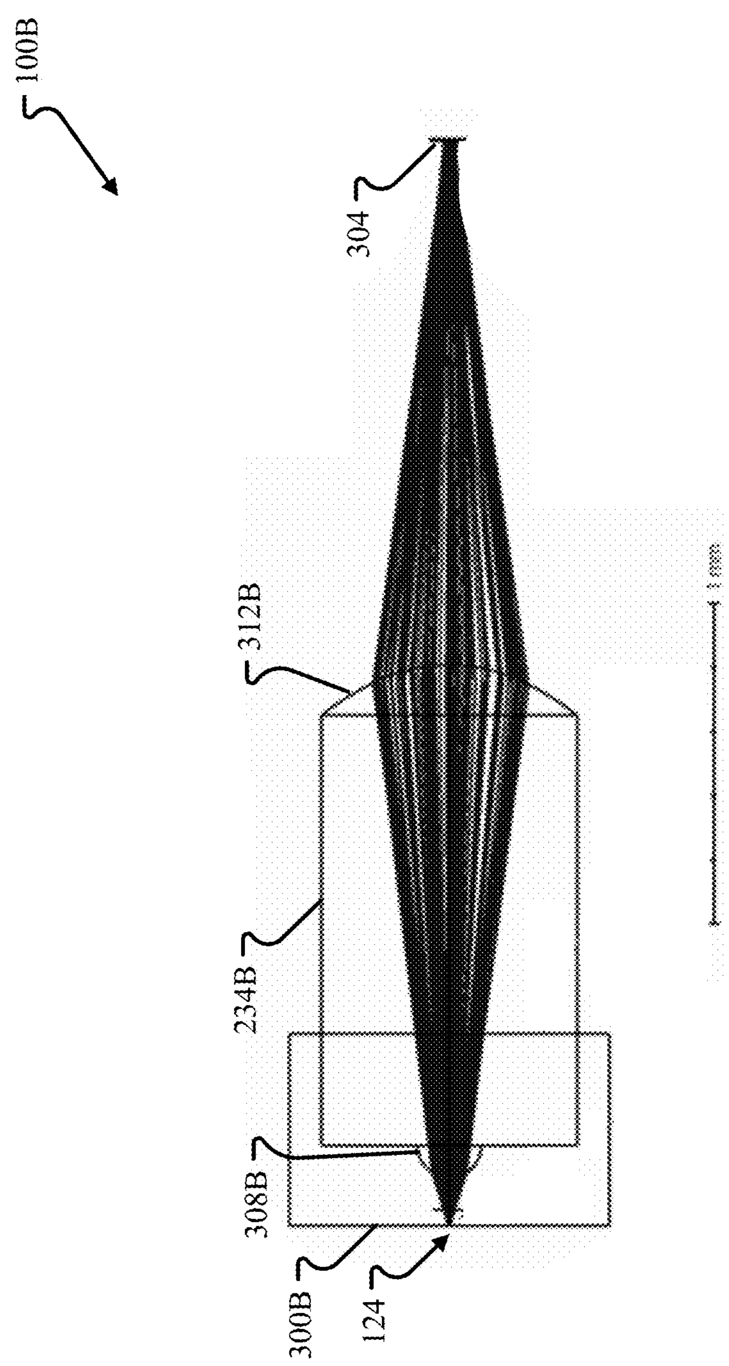
FIG. 5 illustrates a schematic representation of an optical system according to at least one example embodiment.
Figure 6:
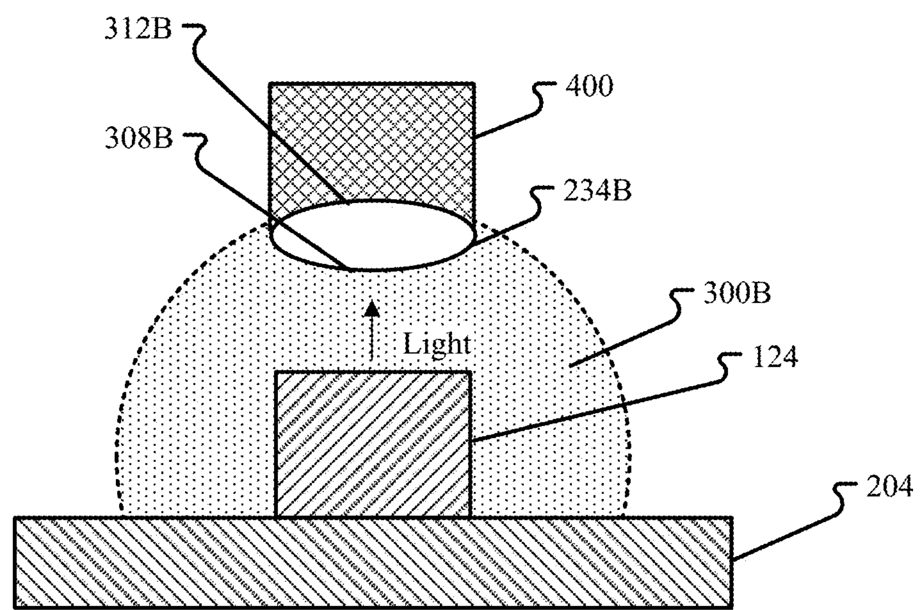
FIG. 6 illustrates an example structure of a protective layer for the optical system of FIG. 5 according to at least one example embodiment.

FIG. 5 illustrates a schematic representation of an optical system 100B according to at least one example embodiment. FIG. 6 illustrates an example structure for a lens 234B of a transceiver 116 and a protective layer 300B for the schematic of FIG. 5 according to at least one example embodiment.

Here, it should be appreciated that FIGS. 5 and 6 illustrate an example where the protective layer 300B encapsulates the VCSEL 124 and lens surface 308B while filling a space between the VCSEL 124 and the lens surface 308B. In other words, the protective layer 300B is a substantially solid material formed over the VCSEL 124 and the lens 234 (i.e., there is no cavity 316 as in FIG. 4). As in FIGS. 3 and 4, the protective layer 300B may be formed on the VCSEL 124 and then the surface 308B depressed into the protective layer. Additionally or alternatively, the protective layer 300B may be formed to cover the VCSEL and the lens surface 308B after the housing 208 with lens 234B is mounted to the support substrate 204. The protective layer 300B may have a thickness of 200 um to 500 um, or more.

The lens 234B may comprise a different material than polymer. For example, in order to account for the denser environment between the VCSEL 124 and the lens 234B, lens 234B may include sapphire, silicon, or cubic zirconia. In addition, the lens surface 308B may include a separate anti-reflection coating. In the event that the lens 234B comprises sapphire, a suitable anti-reflection coating may include an SU-8 layer on the lens surface 308B with a thickness of 134.5 nm. If the lens 234B comprises silicon, then a suitable anti-reflection coating may include a layer of silicon nitride with a thickness of about 164 nm.

In the example of FIGS. 5 and 6, and with a sapphire lens 234B, the radius of curvature for the first lens surface 308B is 100 um and the conic constant is zero or about zero while the radius of curvature for the lens surface 312B is 488 um and the conic constant is −1.235. As may be appreciated, in the first lens surface 308B is a perfect or is an almost perfect hemisphere in order to achieve adequate performance and account for the refractive power of the lens 234B being reduced. Further, the aperture of the lens 234 must be higher so as to collect the rays on the output side (lens surface 312B). Nevertheless, the achieved optical performance for the system 100B is about 90%, which is still within acceptable limits for transmission. With a silicon lens 234B, the radius of curvature for the lens surface 308B may be between 500 um to 700 um and the conic constant between −1.0 and −2.0, and the target wavelength for the VCSEL 124 should be greater than 1000 nm.

Here, it should be appreciated that radii of curvatures and conic constants discussed in the examples of FIGS. 3-6 relate to an example where the protective layer comprises parylene, which has a refractive index greater than 1.5.

Figure 7:
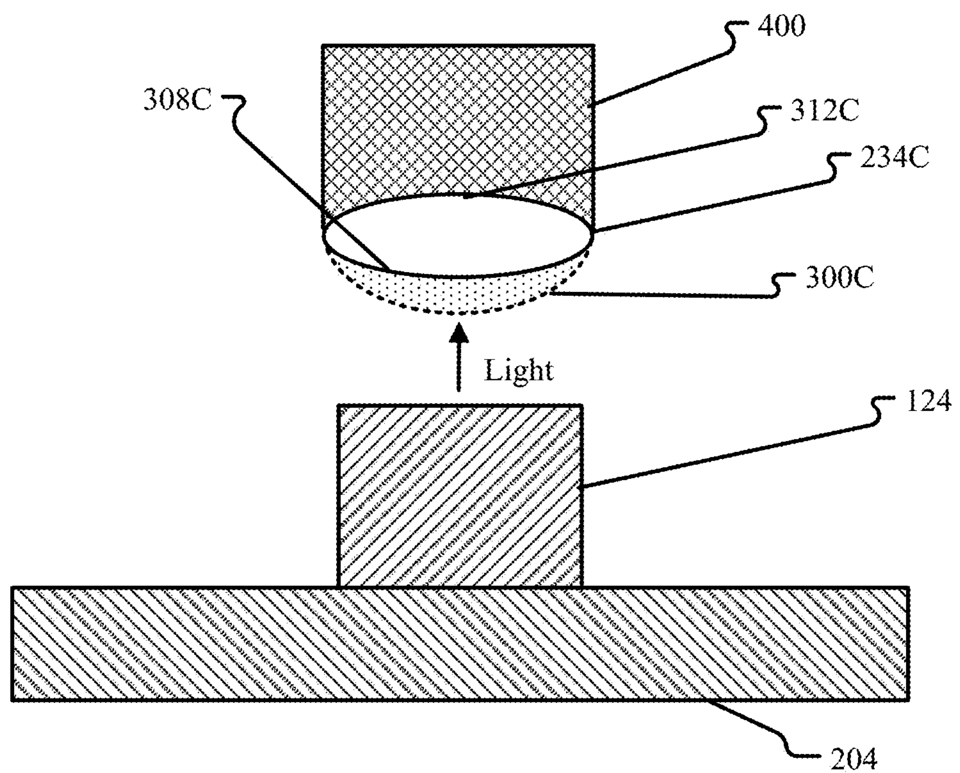
FIG. 7 illustrates an example structure of a protective layer for an optical system according to at least one example embodiment.

FIG. 7 illustrates an example structure for a lens 234C of a transceiver and a protective layer 300C according to at least one example embodiment. As shown in FIG. 7, the protective layer 300C encapsulates only the lens surface 308C of lens 234C. Here, the radius of curvatures and conic constants may be adjusted to have values that achieve the desired optical performance.

Figure 8A:
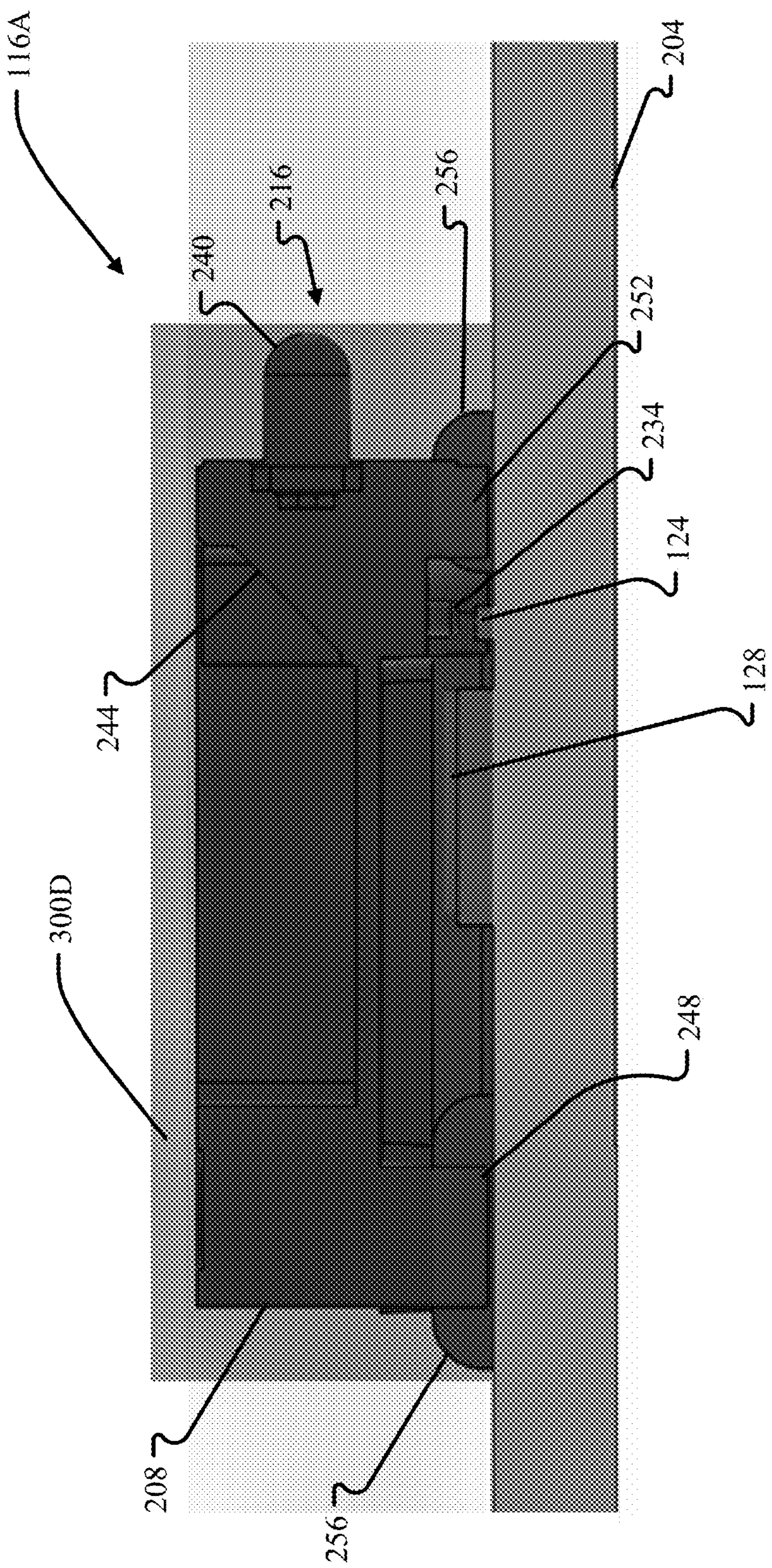
FIG. 8A illustrates a side view of a transceiver according to at least one example embodiment.
Figure 8B:
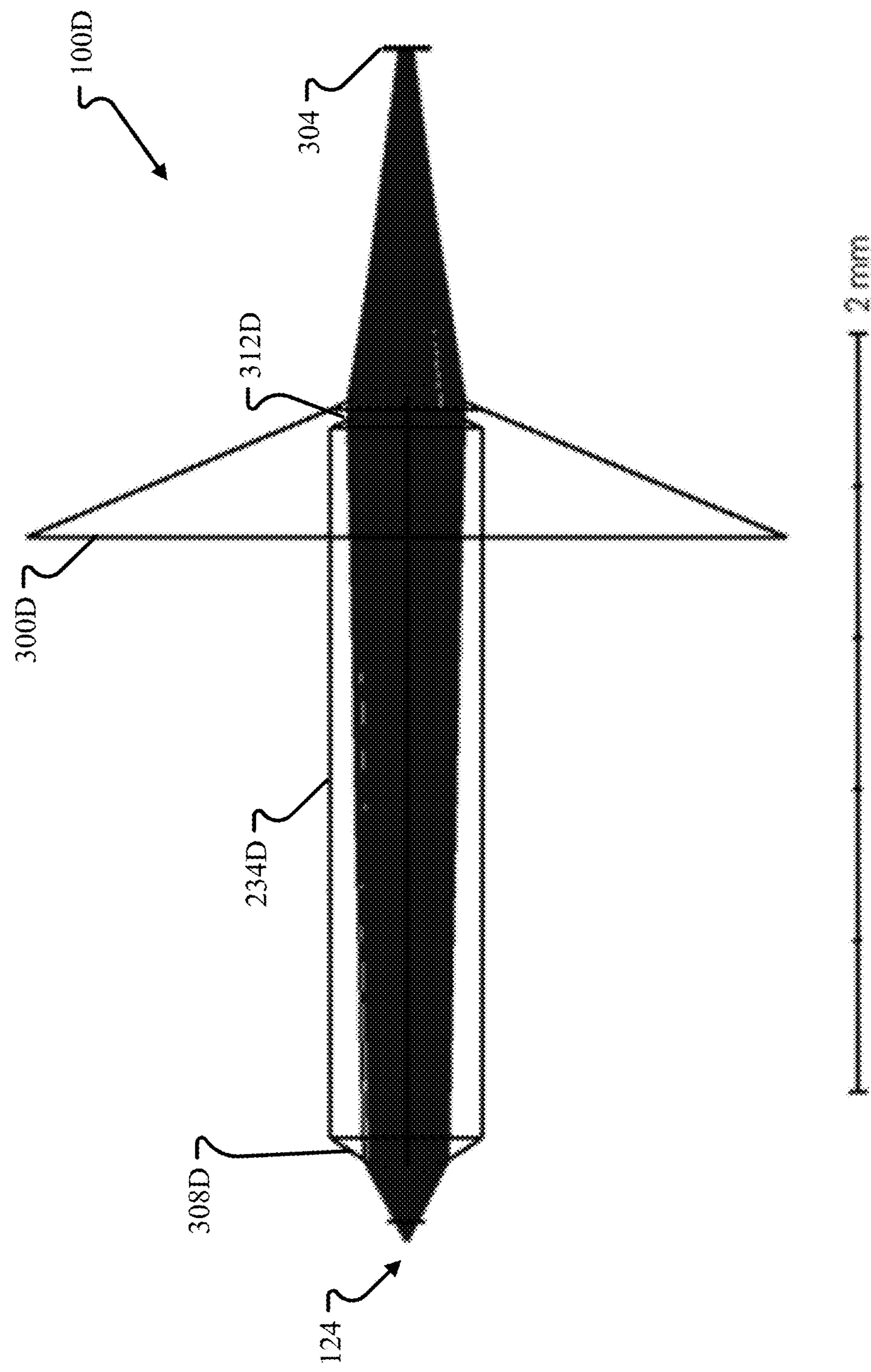
FIG. 8B illustrates a schematic representation of an optical system according to at least one example embodiment.

FIG. 8A illustrates a side view of a transceiver 116A according to at least one example embodiment. FIG. 8B illustrates a schematic representation of an optical system 100D including the transceiver 116A from FIG. 8A according to at least one example embodiment.

FIG. 8A is the same as FIG. 2B except that FIG. 8A includes a protective layer 300D that encapsulates the entire housing 208 with connectors 212 and 216. In this case, the protective layer 300D may be formed to encapsulate the entire housing 208 after the housing 208 is mounted to the support substrate 204. This method of forming the protective layer 300D also prevents the protective layer 300D from being formed on the lens surface 308D in FIG. 8B. It should be appreciated that less than all of the housing 208 may be encapsulated by the protective layer 300D if desired.

Similar to FIGS. 3 and 5, the system 100D in FIG. 8B includes the VCSEL 124 and the point 304. In FIG. 8B, however, the lens 234D has a lens surface 308D closest to the VCSEL 124 and a lens surface 312 furthest from the VCSEL 124. The system 100D further includes a protective layer 300D (e.g., a parylene layer) that encapsulates the lens surface 312D. It should be appreciated that the schematic representation of FIG. 8B may correspond to an embodiment In the example of FIGS. 8A and 8B, a radius of curvature for the lens surface 312D may be about 230 um. The conic constant for the lens surface 312D may be about 4.0, and the distance between the lens surface 312D and the MMF may be about 2960 um. The protective layer 300D on the lens surface 312D may comprise parylene with a thickness of about 146 nm to serve as an antireflection layer. The radius of curvature and the conic constant of lens surface 308D are adjusted accordingly, and the coupling efficiency for this example may be greater than 90%.

As shown by the scale in FIGS. 3, 5, and 8, each lens 234 is between 1 mm and about 2 mm thick. However, the lens thickness may vary according to design preferences.

Here, it should be appreciated that FIGS. 3-8B have been shown and described with reference to the transmit side of the transceiver 116. However, as noted above, the structure of the receive side of the transceiver 116 with the detector 136 and the amplification circuitry 140 may be substantially the same except that the VCSEL 124 is replaced by the detector 136. For example, example embodiments contemplate replacing the VCSEL 124 in FIGS. 4, 6, and 7 with the detector 136 to encapsulate the detector 136, a corresponding surface of a detector lens 234, and/or other components on the receive side of the transceiver 116 with the protective layer 300 in the same manner as that described above for the transmit side of the transceiver 116. In this case, the lens surfaces 308 and 312 of lens 234 on the receive side of the transceiver may be adjusted to have radius of curvatures and conic constants that improve detection of light by the detector 136.

With reference to FIGS. 1-8B, it should be appreciated that example embodiments provide a package 200 comprising a light emitting portion 124 configured to emit light, and a lens 234 including a first lens surface 308 and a second lens surface 312. The first lens surface 308 is configured to receive the emitted light from the light emitting portion 124, and the second lens surface 312 is configured output light that has passed through the first lens surface 308. The package further includes a protective layer 300 between the light emitting portion 124 and the first lens surface 308 and that shields the first lens surface 308 from a surrounding environment. The protective layer has a refractive index greater than 1.5. The package further includes an optical component 244 that redirects light output from the second lens surface 312.

As noted above, the lens 234 comprises a biconvex lens formed by the first lens surface 308 and the second lens surface 312. A radius of curvature of the first lens surface 308 is different from a radius of curvature of the second lens surface 312. As shown in various figures, the protective layer 300 encapsulates the first lens surface 308 and not the second lens surface 312. In at least one example embodiment, the protective layer 300 encapsulates the light emitting portion 124. For example, the protective layer 300 fills a space between the light emitting portion 124 and the first lens surface 308. In at least one example embodiment, a conic constant of the first lens surface 308 is greater than or equal to zero, and a conic constant of the second lens surface 312 is negative. As shown, the package further includes a support substrate 204, and a housing 208 mounted to the support substrate 204. The light emitting portion 124 is mounted to the support substrate 204 and positioned within the housing 208, and the lens 234 is positioned within the housing 208. The package further includes a connector on the housing 208 and configured to interface with an optical waveguide and pass light output from the second lens surface 312 to the optical waveguide. In at least one example embodiment, the protective layer comprises parylene, which may be formed according to a chemical vapor deposition (CVD) technique.

Still with reference to FIGS. 1-8B, example embodiments provide an optical package 200 that includes a housing 208, a transmitter included in the housing 208 and including a light emitting portion 124 configured to emit light modulated according to a first data signal, and a first lens 234 spaced apart from the light emitting portion 124 and configured to receive the emitted light from the light emitting portion 124. The transmitter includes a first parylene layer 300 between the light emitting portion 124 and the first lens 234 to shield a first lens surface 308 of the first lens 234 from a surrounding environment. The package includes a receiver included in the housing 208. The receiver includes an optical detector 136 configured to detect light modulated according to a second data signal, a second lens 234 (separate from the first lens) spaced apart from the optical detector 136 and configured to direct the light modulated according to the second data signal to the optical detector 136, and a second parylene layer 300 between the optical detector 136 and a first lens surface 308 of the second lens 234 to shield the first lens surface 308 of the second lens 234 from the surrounding environment.

In at least one example embodiment, the first parylene layer and the second parylene layer are integrated with one another as a single layer 300. In one embodiment, the first parylene layer 300 encapsulates the first lens surface 308 of the first lens 234, and the second parylene layer 300 encapsulates the first lens surface 308 of the second lens 234. The first parylene layer 300 further encapsulates the light emitting portion 124, and the second parylene layer further encapsulates the optical detector 136. The first parylene layer or the second parylene layer covers at least part of the housing 208 (see e.g., layer 256 in FIG. 2B where layer 256 may comprise parylene). The first parylene layer 300 fills a space between the first lens surface 308 of the first lens 234 and the light emitting portion 124. The optical package further includes an optical component 244 configured to redirect light output from a second lens surface 312 of the first lens 234. The optical package further comprises a connector on the housing and configured to interface with an optical waveguide. In one example, a conic constant of the first lens surface 308 of the first lens 234 is about 0 and a conic constant of the second lens surface 312 of the first lens 234 is negative. According to at least one example embodiment, the first lens 234 comprises aluminum sesquioxide (e.g., sapphire), silicon, or zirconium dioxide (e.g., cubic zirconia).

In view of FIGS. 1-8B, it may be further said that example embodiments provide an optical package 200 including a housing. The housing comprises a first lens surface, a parylene layer that encapsulates the first lens surface, a second lens surface opposite the first lens surface, an optical component configured to redirect light received through the second lens surface, and a connector configured to mechanically and optically align an optical fiber. The optical package further includes a (VCSEL) positioned in the housing and configured to emit light along an optical path that traverses the first lens surface, the second lens surface, the optical component, and the connector in that order.

In view of the foregoing, it should be appreciated that inventive concepts relate to, among other things, including one or more protective layers in an optical transceiver to protect optical components and/or electrical components of the transceiver to improve lifespan of the device while maintaining acceptable levels of performance. Parylene is one such material for the protective layer, but other materials with similar properties and/or deposition characteristics may be used.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

Example embodiments may be configured according to the following:

(1) A package, comprising:

a light emitting portion configured to emit light;

a lens including a first lens surface and a second lens surface, the first lens surface being configured to receive the emitted light from the light emitting portion, the second lens surface being configured output light that has passed through the first lens surface;

a protective layer between the light emitting portion and the first lens surface and that shields the first lens surface from a surrounding environment, wherein the protective layer has a refractive index greater than 1.5; and an optical component that redirects light output from the second lens surface.

(2) The package of (1), wherein the lens comprises a biconvex lens formed by the first lens surface and the second lens surface.

(3) The package of one or more of (1) to (2), wherein a radius of curvature of the first lens surface is different from a radius of curvature of the second lens surface.

(4) The package of one or more of (1) to (3), wherein the protective layer encapsulates the first lens surface and not the second lens surface.

(5) The package of one or more of (1) to (4), wherein the protective layer encapsulates the light emitting portion.

(6) The package of one or more of (1) to (5), wherein the protective layer fills a space between the light emitting portion and the first lens surface.

(7) The package of one or more of (1) to (6), wherein a conic constant of the first lens surface is greater than or equal to zero, and wherein a conic constant of the second lens surface is negative.

(8) The package of one or more of (1) to (7), further comprising:

a support substrate;

a housing mounted to the support substrate, wherein the light emitting portion is mounted to the support substrate and positioned within the housing, and wherein the lens is positioned within the housing; and a connector on the housing and configured to interface with an optical waveguide and pass light output from the second lens surface to the optical waveguide.

(9) The package of one or more of (1) to (8), wherein the protective layer comprises parylene.

(10) An optical package, comprising:

a housing;

a transmitter included in the housing and comprising:

a light emitting portion configured to emit light modulated according to a first data signal;

a first lens spaced apart from the light emitting portion and configured to receive the emitted light from the light emitting portion; and a first parylene layer between the light emitting portion and the first lens to shield a first lens surface of the first lens from a surrounding environment; and a receiver included in the housing and comprising:

an optical detector configured to detect light modulated according to a second data signal;

a second lens spaced apart from the optical detector and configured to direct the light modulated according to the second data signal to the optical detector; and a second parylene layer between the optical detector and a first lens surface of the second lens to shield the first lens surface of the second lens from the surrounding environment.

(11) The optical package of (10), wherein the first parylene layer and the second parylene layer are integrated with one another.

(12) The optical package of one or more of (10) to (11), wherein the first parylene layer encapsulates the first lens surface of the first lens, and wherein the second parylene layer encapsulates the first lens surface of the second lens.

(13) The optical package of one or more of (10) to (12), wherein the first parylene layer further encapsulates the light emitting portion, and wherein the second parylene layer further encapsulates the optical detector.

(14) The optical package of one or more of (10) to (13), wherein the first parylene layer or the second parylene layer covers at least part of the housing.

(15) The optical package of one or more of (10) to (14), wherein the first parylene layer fills a space between the first lens surface of the first lens and the light emitting portion.

(16) The optical package of one or more of (10) to (15), further comprising:

an optical component configured to redirect light output from a second lens surface of the first lens.

(17) The optical package of one or more of (10) to (16), further comprising:

a connector on the housing and configured to interface with an optical waveguide.

(18) The optical package of one or more of (10) to (17), wherein a conic constant of the first lens surface of the first lens is about 0 and a conic constant of the second lens surface of the first lens is negative.

(19) The optical package of one or more of (10) to (18), wherein the first lens comprises aluminum sesquioxide, silicon, or zirconium dioxide.

(20) An optical package, comprising:

a housing comprising:

a first lens surface;

a parylene layer that encapsulates the first lens surface;

a second lens surface opposite the first lens surface;

an optical component configured to redirect light received through the first lens surface and the second lens surface; and a connector configured to mechanically and optically align an optical fiber; and a vertical cavity surface emitting laser (VCSEL) positioned in the housing and configured to emit light along an optical path that traverses the first lens surface, the second lens surface, the optical component, and the connector.

What is claimed is:

1. An optical package, comprising:

a housing;

a transmitter included in the housing and comprising:

a light emitting portion configured to emit light modulated according to a first data signal;

a first lens spaced apart from the light emitting portion and configured to receive the emitted light from the light emitting portion; and a first parylene layer between the light emitting portion and the first lens to shield a first lens surface of the first lens from a surrounding environment; and a receiver included in the housing and comprising:

an optical detector configured to detect light modulated according to a second data signal;

a second lens spaced apart from the optical detector and configured to direct the light modulated according to the second data signal to the optical detector; and a second parylene layer between the optical detector and a first lens surface of the second lens to shield the first lens surface of the second lens from the surrounding environment, wherein the first lens surface of the first lens is depressed into a portion of the first parylene layer so that a first surface of the portion of the first parylene layer formed by the depression contacts and encapsulates the first lens surface of the first lens, wherein a second surface of the portion of the first parylene layer contacts and encapsulates the light emitting portion, and wherein the first surface is different from the second surface.

2. The optical package of claim 1, wherein the first parylene layer and the second parylene layer are integrated with one another.

3. The optical package of claim 1, wherein the second parylene layer encapsulates the first lens surface of the second lens.

4. The optical package of claim 3, wherein the second parylene layer further encapsulates the optical detector.

5. The optical package of claim 4, wherein the first parylene layer or the second parylene layer covers at least part of the housing.

6. The optical package of claim 1, wherein the first lens comprises a biconvex lens having the first lens surface and a second lens surface.

7. The optical package of claim 6, wherein a radius of curvature of the first lens surface of the first lens is different from a radius of curvature of the second lens surface of the first lens.

8. The optical package of claim 1, wherein the first parylene layer encapsulates the first lens surface of the first lens and not the second lens surface of the first lens.

9. The optical package of claim 6, wherein the first parylene layer encapsulates the second lens surface of the first lens.

10. The optical package of claim 1, wherein the first parylene layer fills empty space between the light emitting portion and the first lens surface of the first lens.

11. The optical package of claim 6, wherein a conic constant of the first lens surface of the first lens is greater than or equal to zero, and wherein a conic constant of the second lens surface of the first lens is negative.

12. The optical package of claim 6, further comprising:

a support substrate, wherein the light emitting portion is mounted to the support substrate and positioned within the housing, and wherein the first lens is positioned within the housing; and a connector on the housing and configured to interface with an optical waveguide and pass light output from the second lens surface of the first lens to the optical waveguide.

13. The optical package of claim 1, wherein the portion of the first parylene layer comprises a hollow bubble.

14. The optical package of claim 1, further comprising:

an optical component configured to redirect light output from a second lens surface of the first lens.

15. The optical package of claim 14, further comprising:

a connector on the housing and configured to interface with an optical waveguide.

16. The optical package of claim 15, wherein a conic constant of the first lens surface of the first lens is 0 and a conic constant of the second lens surface of the first lens is negative.

17. The optical package of claim 1, wherein the first lens comprises aluminum sesquioxide, silicon, or zirconium dioxide.

18. An optical package, comprising:

a housing;

a transmitter included in the housing and comprising:

a light emitting portion configured to emit light modulated according to a first data signal;

a first lens spaced apart from the light emitting portion and configured to receive the emitted light from the light emitting portion; and a first parylene layer between the light emitting portion and the first lens to shield a first lens surface of the first lens from a surrounding environment; and a receiver included in the housing and comprising:

an optical detector configured to detect light modulated according to a second data signal;

a second lens spaced apart from the optical detector and configured to direct the light modulated according to the second data signal to the optical detector; and a second parylene layer between the optical detector and a first lens surface of the second lens to shield the first lens surface of the second lens from the surrounding environment, wherein the first parylene layer encapsulates the first lens surface of the first lens and the light emitting portions so that the first parylene layer fills empty space between the first lens surface of the first lens and the light emitting portion.

19. An optical package, comprising:

a support substrate;

a housing mounted to the support substrate;

a transmitter comprising:

a light emitting portion configured to emit light modulated according to a first data signal, wherein the light emitting portion is mounted to the support substrate and positioned within the housing when the housing is mounted to the support substrate;

a first lens spaced apart from the light emitting portion and configured to receive the emitted light from the light emitting portion, wherein the first lens forms part of the housing; and a first parylene layer between the light emitting portion and the first lens to shield a first lens surface of the first lens from a surrounding environment; and a receiver comprising:

an optical detector configured to detect light modulated according to a second data signal, wherein the optical detector is mounted to the support substrate and positioned within the housing when the housing is mounted to the support substrate;

a second lens spaced apart from the optical detector and configured to direct the light modulated according to the second data signal to the optical detector, wherein the second lens forms part of the housing; and a second parylene layer between the optical detector and a first lens surface of the second lens to shield the first lens surface of the second lens from the surrounding environment.

20. The optical package of claim 19, further comprising:

a connector on the housing and configured to interface with an optical waveguide, wherein the first parylene layer or the second parylene layer encapsulates the entire housing and the connector.

* * * * *